(12) United States Patent
Kress et al.

(10) Patent No.: US 11,036,051 B2
(45) Date of Patent: *Jun. 15, 2021

(54) HEAD WEARABLE DISPLAY USING POWERLESS OPTICAL COMBINER

(71) Applicant: GOOGLE LLC, Mountain View, CA (US)

(72) Inventors: Bernard C. Kress, Redwood City, CA (US); Ehsan Saeedi, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/583,480

(22) Filed: Sep. 26, 2019

(65) Prior Publication Data

US 2020/0041798 A1  Feb. 6, 2020

Related U.S. Application Data

(63) Continuation of application No. 14/289,498, filed on May 28, 2014, now Pat. No. 10,459,228.

(51) Int. Cl.
*G02B 27/01* (2006.01)
*G02B 5/18* (2006.01)

(52) U.S. Cl.
CPC ....... *G02B 27/0172* (2013.01); *G02B 5/1861* (2013.01)

(58) Field of Classification Search
CPC .. G02B 5/1861; G02B 5/1809; G02B 5/1814; G02B 5/1842; G02B 26/0808; G02B 27/1086; G02B 5/18; G02B 5/1866; G02B 27/0172; G02B 5/1828; G02B 5/1847; G02B 6/34; G02B 27/4244; G02B 5/1819; G02B 5/203; G02B 6/124; G02B 1/14; G02B 2027/0125; G02B 2027/0174; G02B 26/0816; B42D 25/328; B42D 25/29;

(Continued)

(56) References Cited

U.S. PATENT DOCUMENTS 8,503,087 B1 * 8/2013 Amirparviz .......... G02B 27/143
359/630
2008/0198471 A1 * 8/2008 Amitai .................. G02B 27/285
359/630

(Continued)

*Primary Examiner* — William R Alexander
*Assistant Examiner* — Sharrief I Broome

(57) ABSTRACT

An optical apparatus includes a lightguide and an optical combiner. The lightguide receives display light having an initial cross-section size and guides the display light down the lightguide. The lightguide includes internal optical elements that redirect the display light out of the lightguide with an expanded cross-section size that is larger than the initial cross-section size. The optical combiner combines the display light having the expanded cross-section with ambient scene light. The optical combiner includes an ambient scene side, an eye-ward side, and one or more reflective optical elements that pass at least a portion of the ambient scene light incident along an eye-ward direction on the ambient scene side through to the eye-ward side and redirect the display light having the expanded cross-section and incident on the eye-ward side to the eye-ward direction. The one or more reflective optical elements are substantially without lensing power.

20 Claims, 4 Drawing Sheets

(58) Field of Classification Search
CPC .. B42D 25/324; B42D 2035/24; B42D 25/00; B42D 25/373; B42D 25/36; B42D 2033/10; B42D 2033/18; B42D 2035/14; B42D 25/378; B42D 25/425; B42D 25/45; B42D 15/00; B42D 2033/04; B42D 2033/06; B42D 2033/20; B42D 2033/24; B42D 2035/16; B42D 25/21; G03H 1/0244; G03H 1/0011; G03H 2250/36; G03H 1/0252; G03H 2001/188; G03H 1/0256; G03H 1/08; G03H 1/265; G03H 2001/0016; G03H 2001/303; G03H 2250/10; G03H 2250/34; G03H 1/02; G03H 1/0248; G03H 1/04; G03H 1/182; G03H 1/2249; G03H 1/2286; G03H 1/26; G03H 1/2645; H01S 3/0057; H01S 5/18319; H01S 3/08009; H01S 3/08059; H01S 5/105; H01S 5/1209; H01S 5/141; H01S 5/18355; H01S 5/18361; H01S 5/18366; H01S 5/405; H01S 5/4062; H01S 2301/18; H01S 3/0007; H01S 3/005; H01S 3/0071; H01S 3/06754; H01S 3/06758; H01S 3/0805; H01S 3/109; H01L 2924/0002; H01L 2924/00; H01L 21/02002; H01L 21/02005; H01L 21/0237; H01L 21/02458; H01L 21/02513; H01L 21/0254; H01L 21/0262; H01L 21/02631; H01L 21/02658; H01L 21/306; H01L 21/30612; H01L 21/30625; H01L 21/30635; H01L 21/326; H01L 21/7813; H01L 23/544; H01L 27/1462; H01L 27/14625; G03F 1/84; G03F 1/68; G03F 7/2037; G03F 7/70025; G03F 7/70041; G03F 7/70058; G03F 7/70133; G03F 7/70291; G03F 7/70516; G03F 7/70558; G03F 7/70575; G03F 7/70583; G03F 7/70633; G03F 7/70683; G03F 7/70775; G03F 7/70825; G03F 7/70858; G03F 7/70891; G03F 9/70; G03F 9/7046

See application file for complete search history.

(56) References Cited

U.S. PATENT DOCUMENTS

| | | | | |
|---|---|---|---|---|
| 2010/0046070 | A1* | 2/2010 | Mukawa | G02B 27/0176 359/480 |
| 2011/0213664 | A1* | 9/2011 | Osterhout | G06F 3/013 705/14.58 |
| 2012/0242697 | A1* | 9/2012 | Border | G06F 3/017 345/633 |
| 2013/0181888 | A1* | 7/2013 | Kuriya | G06F 1/163 345/8 |
| 2013/0222896 | A1* | 8/2013 | Komatsu | G02B 27/017 359/365 |

\* cited by examiner

HEAD WEARABLE DISPLAY USING POWERLESS OPTICAL COMBINER

CROSS-REFERENCE TO RELATED APPLICATION

The presentation application is a continuation application of U.S. patent application Ser. No. 14/289,498, entitled "HEAD WEARABLE DISPLAY USING POWERLESS OPTICAL COMBINER" and filed on May 28, 2014, the entirety of which is incorporated by reference herein.

BACKGROUND INFORMATION

A head mounted display ("HMD") or head wearable display is a display device worn on or about the head. HMDs usually incorporate some sort of near-to-eye optical system to create a magnified virtual image placed a few meters in front of the user. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD typically includes some form of see-through eyepiece and can serve as the hardware platform for realizing augmented reality. With augmented reality the viewer's image of the world is augmented with an overlaying CGI, also referred to as a heads-up display ("HUD").

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be newfound practical and leisure applications as the technology evolves; however, many of these applications are limited due to the cost, size, weight, field of view, eye box, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method of operation for a head wearable display including a lightguide and optical combiner are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
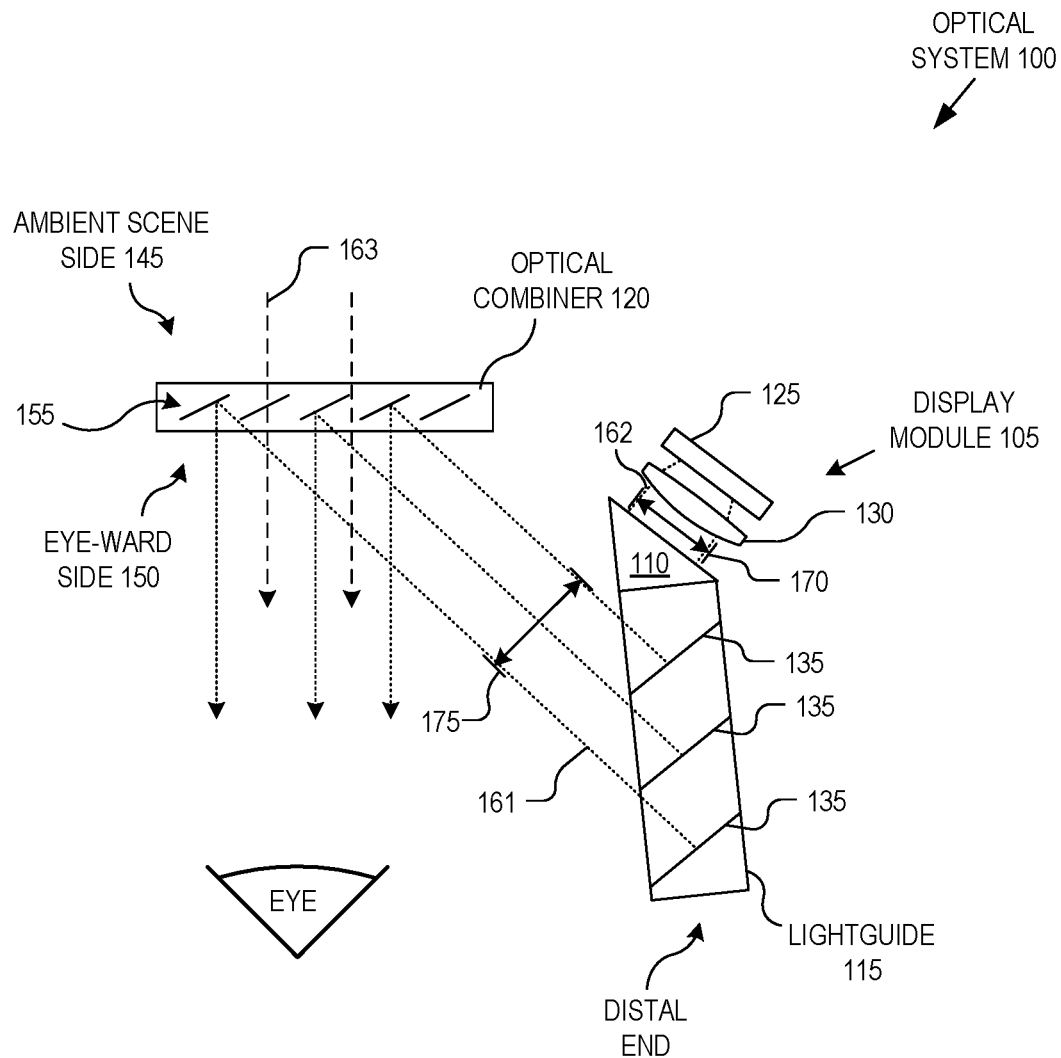
FIG. 1 illustrates an optical system including a lightguide and optical combiner for use with a see-through head wearable display, in accordance with an embodiment of the disclosure.

FIG. 1 illustrates an optical system 100 including a lightguide and optical combiner for use with a see-through head wearable display, in accordance with an embodiment of the disclosure. The illustrated embodiment of optical system 100 includes a display module 105, in-coupling optics 110, a lightguide 115, and an optical combiner 120. The illustrated embodiment of display module 105 includes a display source 125 and collimation optics 130. The illustrated embodiment of lightguide 115 includes a plurality of internal optical elements 135. The illustrated embodiment of optical combiner 120 includes an ambient scene side 145, eye-ward side 150, and one or more reflective optical elements 155 that impart substantially no optical power on display light 161.

Optical system 100 is a free-space apparatus that delivers an image generated peripherally to the user's central vision (e.g., temple region) into the user's eye. This design addresses a number of drawbacks associated with conventional free space designs that use an optical combiner with lensing power to collimate the display light and bring the image into easy focus for the user. Conventionally, the collimation optical power is positioned within the eyepiece optical combiner to bring it as close to the eye as possible. Placing the collimation optics close to the eye generally provides a larger eyebox, which accommodates a larger range of inter-pupillary distances of different users. While this conventional setup provides for a larger eyebox, it has a number of other drawbacks. For example, positioning the collimation optics within the eyepiece optical combiner typically results in larger, bulkier lenses, which are less desirable from an industrial design perspective. Collimation optics positioned directly in front of the eye also affect external light, and therefore disturb the user's see-through vision. Since the eyepiece optical combiner is typically illuminated from an off-axis or peripheral location, an off-axis lens function must be used when locating the collimation optics within the centrally located eyepiece optical combiner. Off axis lensing suffers from degraded image quality (e.g., comma, field distortions, astigmatisms, etc.). These optical aberrations detract from the user's experience, or should be compensated for elsewhere within the optical system using costly and sometimes bulking optics.

Optical system 100 overcomes many of the above drawbacks associated with conventional free space designs by using a see-through optical combiner 120 positioned in front of the user's eye that uses reflective optical elements 155 that impart substantially no optical power on display light 161. Instead collimation optics 130 are repositioned to the periphery (e.g., temple region) outside of the user's central vision and external to optical combiner 120. By repositioning collimation optics 130 external to optical combiner 120, optical combiner 120 can be made thin (e.g., 1 mm) for desirable industrial design. Optical combiner 120 need not provide collimation lensing power to display light 161 and therefore does not distort the user's see-through vision of ambient scene light 163. Without need of collimation lensing, reflective optical elements 155 within optical combiner 120 can be simpler optical elements that are easier and less expensive to fabricate. Optical system 100 repositions the lensing function to display module 105. Collimation optics 130 are centrally located over display source 125 and therefore provide on-axis lensing, which does not suffer from the aberrations typified by off-axis lenses.

However, by placing collimation optics 130 within display module 105, which is further from the user's eye, the eyebox of the optical system is reduced. To address this concern, optical system 100 positions lightguide 115 between display module 105 and optical combiner 120 to expand the cross-section size of the display light. Lightguide 115 operates as an exit pupil expander by receiving display light 162 having an initial cross-section size 170 and outputting display light 161 having an expanded cross-section size 175 that is larger than initial cross-section size 170. This expansion serves to offset the negative effects on eyebox associated with displacing collimation optics 130 further from the user's eye.

Accordingly, optical system 100 enables the use of a segmented powerless optical combiner. The use of powerless segments (e.g., reflective optical elements 155) is desirable since they can be identical, replicated elements that therefore do not require careful lateral alignment to accommodate different inter-pupillary distances—unlike optical combiners with power. The replication of these powerless segments lends itself to less expensive fabrication techniques. Having selected a powerless optical combiner, the lensing power is moved further away from the eye and placed into display module 105 near the user's temple region. As mentioned above, this reduces the size of the eye box, which is inversely proportional to the distance between the eye and the collimation optics (e.g., collimation optics 130). Optical system 100 compensates for this reduction in eye box using lightguide 115 as an eye box expander. In one embodiment, lightguide 115 is a waveguide imbedded with coated-dichroic-cascaded mirrors (e.g., internal optical elements 135). Lightguide 115 does not operate as an optical combiner positioned in front of the user's forward vision, rather lightguide 115 is configured as an exit pupil expander positioned near the user's temple region.

Optical system 100 operates as follows. Display module 105 generates display light 162 having an initial cross-section size 170 for viewing by the user. Display module 105 may be coupled to a micro-processor for real-time generation of computer generated images. Display module 105 includes display source 125 and collimation optics 130. Display source 125 may be implemented using a variety of compact display technologies, including liquid crystal displays ("LCDs"), liquid crystal on silicon ("LCoS") displays, light emitting diode ("LED") displays, organic LED ("OLED") displays, pico-projectors, or otherwise. Collimation optics 130 are positioned over the output of display source 125 to collimate, or nearly collimate, the display light to generate display light 162 having initial cross-section size 170. For example, collimation optics 130 may be configured to virtually displace the display image to appear 1 m to 3 m from the user. Of course, other amounts of collimation may be implemented. In one embodiment, collimation optics 130 are implemented as a refractive on-axis lens.

Display light 162 is injected into lightguide 115 via in-coupling optics 110. In-coupling optics 110 serve to couple display light 162 into lightguide 115 at an angle that promotes propagation via total internal reflection ("TIR") down lightguide 115 from the proximal end near display module 105 to the opposing distal end. In the illustrated embodiment, in-coupling optics 110 is a prism.

In the illustrated embodiment, lightguide 115 is implemented as a planar waveguide with internal optical elements 135 obliquely oriented relative to the planar emission side of lightguide 115. Internal optical elements 135 are partially reflective planar layers offset from each other along the length of lightguide 115 running from the proximal end to the distal end. As display light 162 propagates down lightguide 115 portions of display light 162 are redirected out of lightguide 115 along the emission surface resulting in display light 161 having an expanded cross-section size 175. As mentioned above, lightguide 115 operates as a lightguide expander or exit pupil expander. In one embodiment, internal optical elements 135 are partially reflective surfaces with a multi-layer dichroic coating that has an angle selective reflectivity. The dichroic coating permits a portion of the light incident on a surface to be reflected out of lightguide 115 while permitting another portion to continue propagating down lightguide 115 to subsequent surfaces. In this manner, display light 162 is expanded and redirected out of lightguide 115 as display light 161. Lightguide 115 may be fabricated of glass or plastic with internal optical elements 135 disposed therein.

Display light 161 is emitted from lightguide 115 along a direction that is incident upon eye-ward side 150 of optical combiner 120. Optical combiner 120 may be fabricated using a glass or plastic body having reflective optical elements 155 disposed internally or along the one of side surfaces (e.g., eye-ward side 150 or ambient scene side 145). Reflective optical elements 155 operate to reflect at least a portion of display light 161 incident upon the eye-ward side 150 towards an eye-ward direction. Correspondingly, reflective optical elements 155 also operate to permit at least portion of ambient scene light 163 incident on ambient scene side 145 to pass through to eye-ward side 150 and to the user's eye. In this manner, optical combiner 120 provides a see-through eyepiece that serves to combine ambient scene light 163 with display light 161 for delivery to the eye along an eye-ward direction.

Reflective optical elements 155 may be implemented using a variety of different elements that reflect display light 161 substantially without imparting optical power and passing ambient scene light 163 also substantially without imparting optical power thereto. For example, reflective optical elements 155 may include an array of planar reflective surfaces offset from each other and obliquely oriented relative to eye-ward side 150. In one embodiment, these planar reflective surfaces may be partially reflective surfaces, such as beam splitters or polarization beam splitters. In embodiments, where reflective optical elements 155 are implemented using a diffractive optical element, optical combiner 120 may include a linear diffraction grating or hologram tuned to reflect the display light 161.

Figure 2A:
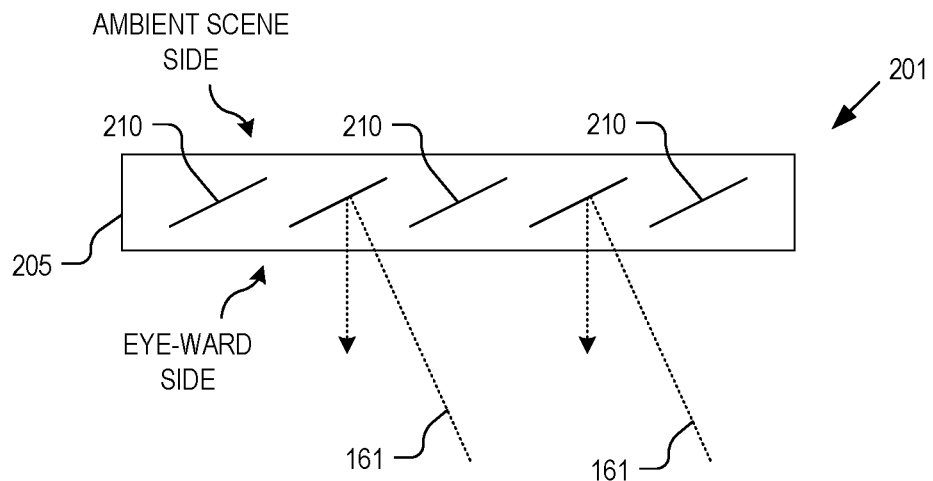
FIGS. 2A-C illustrate various optical combiners for use with a see-through head wearable display, in accordance with embodiments of the disclosure.
Figure 2B:
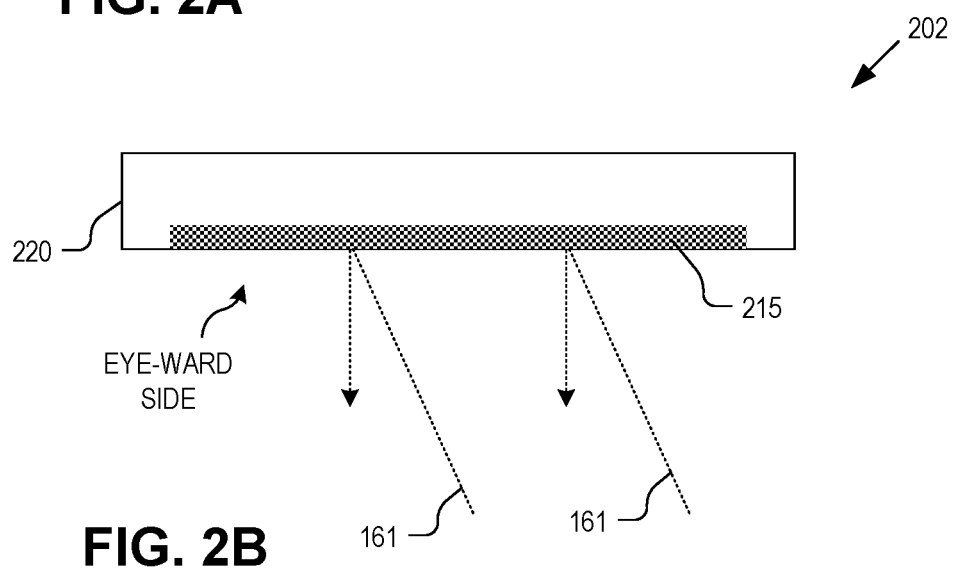
Figure 2C:
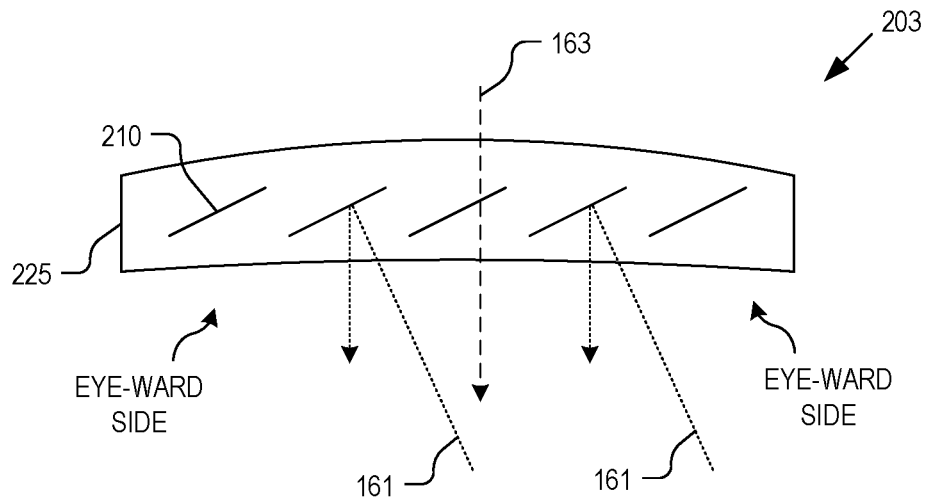

FIGS. 2A to 2C illustrates various possible implementations of optical combiner 120. FIG. 2A illustrates an optical combiner 201 including a linear array of reflective planar surfaces 210 disposed within a lens body 205. Surfaces 210 are offset from each other and obliquely oriented relative to the eye-ward and ambient scene sides. In one embodiment, surfaces 210 may have partially reflective coatings that permit ambient scene light to pass through. In other embodiments, surfaces 210 may be 100% reflective surfaces that only permit ambient scene light to pass through the offset gaps between the surfaces 210. In either case, surfaces 210 are planar surfaces that do not impart substantial optical lensing power to display light 161 in reflection. Surfaces 210 are powerless surfaces, due to the optical path difference between the different portions of display light 161 originating from the different facets (internal optical elements 135) within lightguide 115. If surfaces 210 had lensing power, each portion of display light 161 originating from a different facet within lightguide 115 would appear at different planes in space. Accordingly, the reflective optical elements 155 (or surfaces 210) do not have optical power.

FIG. 2B illustrates an optical combiner 202 including a diffractive optical element ("DOE") 215 disposed along the eye-ward side of a lens body 220. In various other embodiments DOE 215 may be embedded internally or along the ambient scene side. Diffractive optical element 215 may be implemented using a variety of diffractive optic elements. For example, DOE 215 may be a linear grating tuned to reflect the wavelength of display light 161 towards an eye-ward direction. In another embodiment, DOE 215 may be a reflection-mode hologram configured to reflect display light 161 towards an eye-ward direction. In either embodiment, DOE 215 does not impart substantial optical lensing power to display light 161.

FIG. 2C illustrates an optical combiner 203 including surfaces 210 disposed within a lens body 225 with curved ambient scene and/or eye-ward sides that impart corrective optical power to ambient scene light 163. It is noteworthy, that while the side surfaces of lens body 225 may impart optical power, the reflective optical elements 155 (e.g., surfaces 210) substantially do not impart optical power. Since display light 161 enters and exits the same curved eye-ward side of lens body 225, the optical power imparted by this surface is significantly negated by the dual-pass over this refractive boundary. FIG. 2C illustrates how optical combiner 120 can be incorporated into a head wearable display having a prescription lens.

Figure 3:
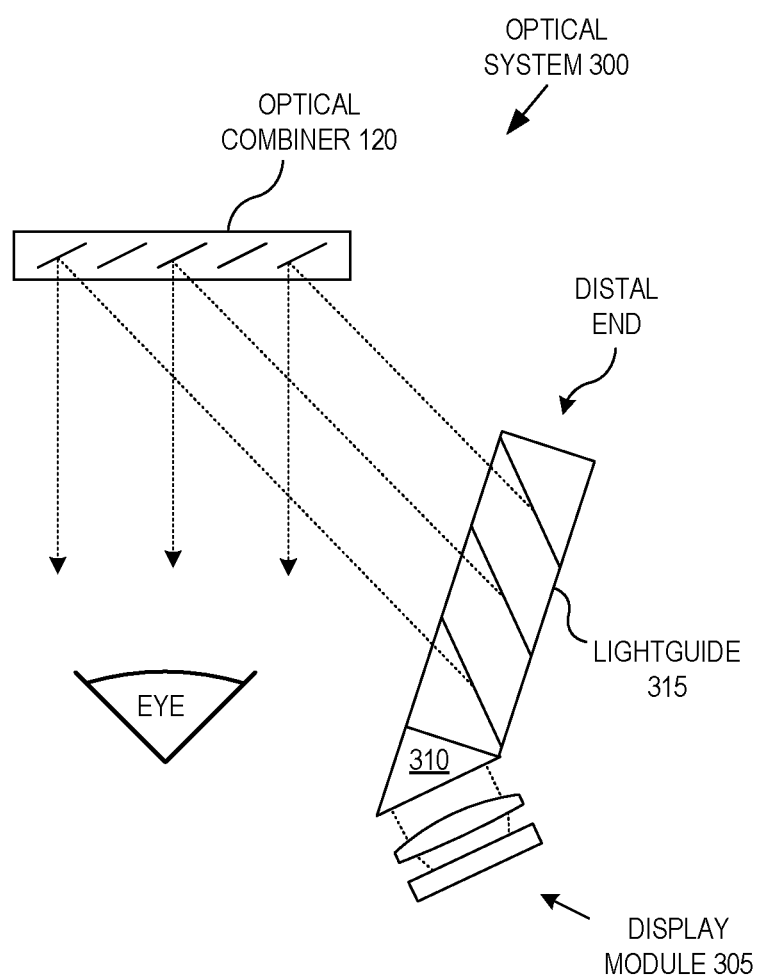
FIG. 3 illustrates an optical system including a lightguide and optical combiner for use with a see-through head wearable display, in accordance with an embodiment of the disclosure.

FIG. 3 illustrates an optical system 300 including a lightguide and optical combiner for use with a see-through head wearable display, in accordance with an embodiment of the disclosure. The illustrated embodiment of optical system 300 includes a display module 305, in-coupling optics 310, a lightguide 315, and an optical combiner 120. Optical system 300 is similar to optical system 100 except the orientations of display module 305, in-coupling optics 310, and lightguide 315 relative to optical combiner 120 have been changed.

Optical system 100 illustrates a "toe-in" embodiment where display module 105 is closer to optical combiner 120 and lightguide 115 angles towards optical combiner 120 running from the distal end towards the display module 105. This orientation of the components may be well suited for head wearable displays where the ear-arms or temple arms of eyewear angle out towards a user's ears. In contrast, optical system 300 places the distal end of lightguide 315 closer to optical combiner 120 and display module 305 further away. This configuration is referred to as a "toe-out" embodiment wherein lightguide 315 angles away from optical combiner 120 running from display module 305 to the distal end. The "toe-out" configuration places the bulk associated with the components of display module 305 further back on the temple region towards a user's ear and thus opens up their peripheral vision. It should be appreciated that other relative orientations, angles, and positions between optical combiner 120 and the lightguide and display module may be implemented and are contemplated herein.

Figure 4:
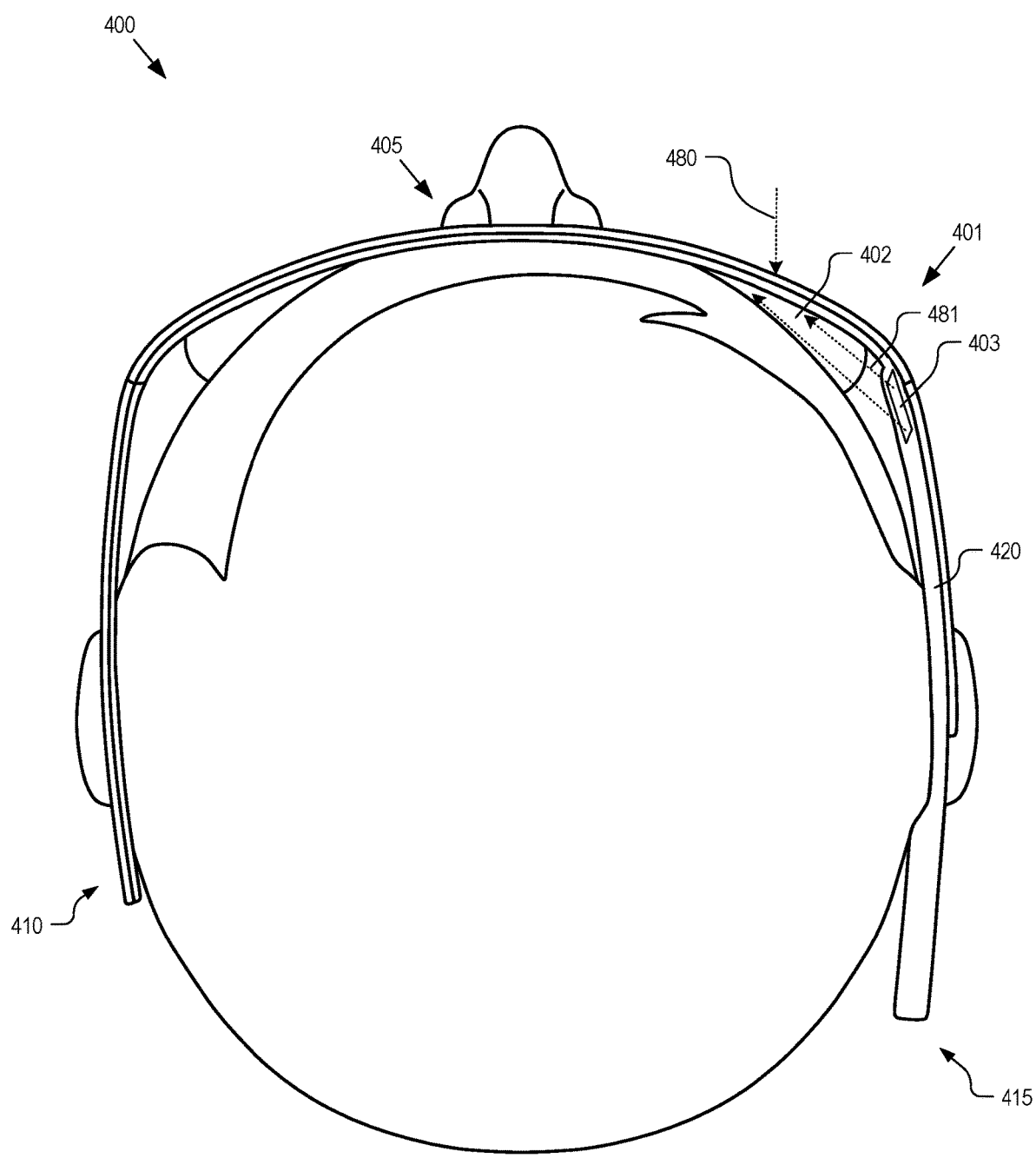
FIG. 4 illustrates a demonstrative see-through head wearable display including a lightguide and optical combiner, in accordance with an embodiment of the disclosure.

FIG. 4 illustrates a monocular head wearable display 400 using an optical system 401 including an optical combiner 402 and lightguide 403 to provide a see-through eyepiece, in accordance with an embodiment of the disclosure. Optical system 401 may be implemented with embodiments of optical systems 100 or 300, as discussed herein, where optical combiner 402 would correspond to optical combiner 120 and lightguide 403 would correspond to either of lightguides 115 or 315. The optical system 401 is mounted to a frame assembly, which includes a nose bridge 405, left ear arm 410, and right ear arm 415. Housing 420 may contain various electronics including a microprocessor, interfaces, one or more wireless transceivers, a battery, a camera, a speaker, a display module (e.g., display modules 105 or 305), lightguide 403, etc. Although FIG. 4 illustrates a monocular embodiment, head wearable display 400 may also be implemented as a binocular display with two optical systems 401 each having an optical combiner 402 aligned with a respective eye of the user when display 400 is worn.

The optical system 401 is secured into an eye glass arrangement or head wearable display that can be worn on the head of a user. The left and right ear arms 410 and 415 rest over the user's ears while nose bridge 405 rests over the user's nose. The frame assembly is shaped and sized to position optical combiner 402 in front of an eye of the user. Other frame assemblies having other shapes may be used (e.g., traditional eyeglasses frame, a single contiguous headset member, a headband, goggles type eyewear, etc.).

The illustrated embodiment of head wearable display 400 is capable of displaying an augmented reality to the user. Optical combiner 402 permits the user to see a real world image via external scene light 480. Display light 481 is emitted from lightguide 403 and generated by a display source mounted in peripheral corners outside the user's central vision. Display light 481 is seen by the user as a virtual image superimposed over external scene light 480 as an augmented reality. In some embodiments, external scene light 480 may be fully, partially, or selectively blocked to provide sun shading characteristics and increase the contrast of image light 481 via.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical apparatus for a head wearable display, comprising:
    a lightguide to receive, at a first side of the lightguide, display light into the lightguide and guide the display light down the lightguide, wherein the lightguide includes a first plurality of reflective optical elements that redirect the display light out of a second side of the lightguide, wherein the first plurality of reflective optical elements comprise an array of planar surfaces offset from each other and obliquely oriented relative to the second side; and
    an optical combiner obliquely oriented relative to the lightguide, the optical combiner to combine the redirected display light with ambient scene light, the optical combiner including:
    an ambient scene side;
    an eye-ward side; and
    a second plurality of reflective optical elements that pass at least a portion of the ambient scene light incident along an eye-ward direction on the ambient scene side through to the eye-ward side and redirect the display light incident on the eye-ward side to the eye-ward direction, wherein the second plurality of reflective optical elements comprise an array of planar surfaces offset from each other and obliquely oriented relative to the ambient and eye-ward sides.

2. The optical apparatus of claim 1, wherein the array of planar surfaces of the second plurality comprises an array of partially reflective surfaces disposed between the ambient scene side and the eye-ward side.

3. The optical apparatus of claim 2, wherein the array of partially reflective surfaces comprises a linear array of planar surfaces offset from each other and obliquely oriented relative to the ambient and eye-ward sides.

4. The optical apparatus of claim 1, wherein the reflective optical elements of the second plurality comprise diffractive optical elements that reflects the display light substantially without imparting optical power to the display light.

5. The optical apparatus of claim 4, wherein the diffractive optical element comprises either a linear grating tuned to reflect the display light towards the eye-ward direction or a reflection-mode hologram configured to reflect the display light towards the eye-ward direction.

6. The optical apparatus of claim 1, wherein one or both of the ambient scene side or the eye-ward side is curved to impart corrective optical power to the ambient scene light.

7. The optical apparatus of claim 6, wherein the reflective optical elements of the second plurality comprise one or more inserts disposed within a lens body including the ambient scene side and the eye-ward side.

8. The optical apparatus of claim 1, wherein the lightguide comprises a planar lightguide and wherein the first plurality of reflective optical elements comprises a plurality of dichroic reflective surfaces disposed along a length of the lightguide at oblique angles relative to sides of the planar lightguide, the dichroic reflective surfaces configured to reflect the display light when incident at an angle while transmitting the display light when incident at a second angle.

9. The optical apparatus of claim 1, further comprising:
    in-coupling optics coupled to a proximal end of the lightguide to couple the display light into the lightguide at a proximal end for propagation down the lightguide towards a distal end of the lightguide via total internal reflection, wherein the reflective optical elements of the first plurality expand the display light by redirecting portions of the display light out a side surface of the lightguide extending between the proximal and distal ends as the display light propagates down the lightguide.

10. The optical apparatus of claim 9, further comprising:
    a display source to generate the display light; and
    collimation optics disposed between the display source and the in-coupling optics, the collimation optics configured to reduce a divergence of the display light.

11. The optical apparatus of claim 1, wherein the second plurality of reflective optical elements are substantially without lensing power.

12. A head wearable display comprising the optical apparatus of claim 1, the head wearable display further comprising:
    a display module to generate display light; and
    a frame assembly to support the display module, the lightguide, and the optical combiner for wearing on a head of a user with the optical combiner positioned in front of an eye of the user.

13. A method of operating a head-wearable display, comprising:
    receiving display light into a first side of a lightguide and guiding the display light down the lightguide, wherein the lightguide includes a first plurality of reflective optical elements that redirect the display light out of a second side of the lightguide, wherein the first plurality of reflective optical elements comprise an array of planar surfaces offset from each other and obliquely oriented relative to the second side; and
    combining the redirected display light with ambient scene light at an optical combiner obliquely oriented relative to the lightguide, the optical combiner including:
    an ambient scene side;
    an eye-ward side; and
    a second plurality of reflective optical elements that pass at least a portion of the ambient scene light incident along an eye-ward direction on the ambient scene side through to the eye-ward side and redirect the display light incident on the eye-ward side to the eye-ward direction, wherein the second plurality of reflective optical elements comprise an array of planar surfaces offset from each other and obliquely oriented relative to the ambient and eye-ward sides.

14. The method of claim 13, wherein the array of planar surfaces of the second plurality comprises an array of partially reflective surfaces disposed between the ambient scene side and the eye-ward side.

15. The method of claim 14, wherein the array of partially reflective surfaces comprises a linear array of planar surfaces offset from each other and obliquely oriented relative to the ambient and eye-ward sides.

16. The method of claim 14, wherein the reflective optical elements of the second plurality comprise diffractive optical elements that reflects the display light substantially without imparting optical power to the display light.

17. The method of claim 16, wherein the diffractive optical element comprises either a linear grating tuned to reflect the display light towards the eye-ward direction or a reflection-mode hologram configured to reflect the display light towards the eye-ward direction.

18. The method of claim 13, wherein one or both of the ambient scene side or the eye-ward side is curved to impart corrective optical power to the ambient scene light.

19. The method of claim 18, wherein the reflective optical elements of the second plurality comprise one or more inserts disposed within a lens body including the ambient scene side and the eye-ward side.

20. The method of claim 13, further comprising:
propagating the display light into the lightguide from a proximal end to a distal end via total internal reflection via in-coupling optics coupled to the proximal end of the lightguide, wherein the reflective optical elements of the first plurality expand the display light by redirecting portions of the display light out a side surface of the lightguide extending between the proximal and distal ends as the display light propagates down the lightguide.

\* \* \* \* \*